(12) United States Patent
Harris et al.

(10) Patent No.: US 11,319,046 B2
(45) Date of Patent: May 3, 2022

(54) FOLDING HEAVY-LIFT UNMANNED AERIAL VEHICLE FRAME

(71) Applicants: Benjamin Harris, Casselberry, FL (US); Ethan Camp Wash, Casselberry, FL (US)

(72) Inventors: Benjamin Harris, Casselberry, FL (US); Ethan Camp Wash, Casselberry, FL (US)

(73) Assignee: Harris Aerial LLC, Casselberry, FL (US)

( * ) Notice: Subject to any disclaimer, the term of this patent is extended or adjusted under 35 U.S.C. 154(b) by 64 days.

(21) Appl. No.: 17/012,513

(22) Filed: Sep. 4, 2020

(65) Prior Publication Data

US 2020/0398966 A1 Dec. 24, 2020

Related U.S. Application Data (63) Continuation-in-part of application No. 16/104,723, filed on Aug. 17, 2018, now Pat. No. 10,994,833, and a continuation-in-part of application No. 15/842,386, filed on Dec. 14, 2017, now Pat. No. 10,780,970, and a continuation-in-part of application No. 15/265,948, filed on Sep. 15, 2016, now Pat. No. 10,266,245.

(60) Provisional application No. 62/318,918, filed on Apr. 6, 2016.

(51) Int. Cl.
*B64C 1/06* (2006.01)
*B64C 39/02* (2006.01)

(52) U.S. Cl.
CPC ............ *B64C 1/063* (2013.01); *B64C 39/024* (2013.01)

(58) Field of Classification Search
CPC ....... B64C 1/061; B64C 1/063; B64C 39/024; B64C 2021/128
See application file for complete search history.

(56) References Cited

U.S. PATENT DOCUMENTS

| | | | |
|---|---|---|---|
| 7,979,960 B2 | 7/2011 | Sano et al. | |
| 2012/0083945 A1 | 4/2012 | Oakley et al. | |
| 2013/0193269 A1 | 8/2013 | Zwaan et al. | |
| 2015/0259066 A1* | 9/2015 | Johannesson | B64C 1/30 244/17.27 |
| 2015/0321755 A1* | 11/2015 | Martin | B64C 39/024 244/17.23 |
| 2015/0321758 A1 | 11/2015 | Sama | |
| 2016/0122016 A1 | 5/2016 | Mintchev et al. | |
| 2016/0152316 A1 | 6/2016 | Wang et al. | |

(Continued)

*Primary Examiner* — Philip J Bonzell
*Assistant Examiner* — Tye William Abell
(74) *Attorney, Agent, or Firm* — Jason T. Daniel, Esq.; Daniel Law Offices, P.A.

(57) ABSTRACT

A heavy-lift UAV frame includes a central frame portion having a symmetrical shape and forming a pocket area for receiving an avionics package. Top and bottom plates are secured to the central frame portion and include four corner members that extend diagonally outward therefrom. A plurality of boom hinges are interposed between each of the corner members and an elongated boom arm. Each of the boom hinges pivot the boom arms between an extended position for flight and a retracted position for storage and transport. Each boom arm and hinge combination includes a complementary dimension to one side of the central frame portion to position a boom arm parallel thereto when in the retracted position.

7 Claims, 8 Drawing Sheets

(56) References Cited

U.S. PATENT DOCUMENTS

| | | |
|---|---|---|
| 2016/0167776 A1 | 6/2016 | Shaw |
| 2016/0325834 A1 | 11/2016 | Foster |
| 2016/0339789 A1 | 11/2016 | Wang et al. |
| 2016/0376004 A1 | 12/2016 | Claridge et al. |
| 2017/0085840 A1 | 3/2017 | Mizushina et al. |
| 2017/0158328 A1 | 6/2017 | Foley |
| 2017/0183074 A1* | 6/2017 | Hutson ............... B64C 1/061 |
| 2017/0203843 A1 | 7/2017 | Chan et al. |
| 2017/0267334 A1 | 9/2017 | Tsai |
| 2018/0002023 A1 | 1/2018 | Tian et al. |
| 2018/0016027 A1 | 1/2018 | Cheatham et al. |

\* cited by examiner

FOLDING HEAVY-LIFT UNMANNED AERIAL VEHICLE FRAME

CROSS-REFERENCE TO RELATED APPLICATIONS

This application claims the benefit of U.S. Application Ser. No. 62/318,918 filed on Apr. 6, 2016, and U.S. Pat. No. 10,266,245 filed on Sep. 15, 2016, and is a continuation-in-part to copending U.S. patent application Ser. No. 15/265,948, filed on Dec. 14, 2017, and U.S. patent application Ser. No. 16/104,723, filed on Aug. 17, 2018, the contents of each of which are incorporated herein by reference.

TECHNICAL FIELD

The present invention relates generally to aerial vehicles, and more particularly to a folding frame for a heavy-lift UAV.

BACKGROUND

The statements in this section merely provide background information related to the present disclosure and may not constitute prior art.

An unmanned aerial vehicle (UAV) is a heavier-than-air flying machine that does not carry a human operator. UAV's are utilized for many different military and civilian applications such as reconnaissance, surveillance, area mapping, and/or photography, for example.

Traditionally, the use and implementation of hobby grade vertical takeoff and landing UAV's was severely limited by the relatively low lifting capacity of the same. However, recent advancements have seen the introduction of small size UAV engines which can carry payloads exceeding 30-50 pounds each, and for prolonged periods of time. As such, UAV's are now being contemplated for use in new industries, and for performing tasks never before possible. In this regard, a heavy-lift UAV is one that is capable of performing sustained flight with payloads greater than 25 pounds. Several examples include equipping a heavy-lift UAV with an agricultural spraying module, LIDAR remote sensing equipment, or a payload basket for transporting goods from one location to another.

Although such applications are promising, the current design and construction of UAV frames is not conducive for heavy-lift applications. This is because traditional UAV frames are constructed from an elongated, generally rectangular main body onto which the payload is secured. A plurality of elongated fixed booms having an engine along the distal ends are secured onto each corner of the main body and extend diagonally outward therefrom. The length of the elongated booms depends on the lifting capacity of the UAV, but typical designs call for a boom length that is approximately twice as long as the length of the main body itself.

Unfortunately, when a heavy-lift UAV is paired with a heavy payload, i.e., payloads that require engine thrust levels at or above 40%, these long booms have a tendency to vibrate during flight. These vibrations often increase over time and can affect the ability for the device to be stable in flight. Moreover, these vibrations combined with the non-symmetrical shape of the main body make it difficult to secure and suspend payloads from the center of mass of the device.

Through rigorous research, development, and testing, it has been determined that these vibrations are often related to excessive play within the hinge mechanisms of a UAV which allows the boom arms to move between a closed/stowed position and an open/ready for flight position. As described herein, this excessive play (also referred to as "slop") is defined as any movement of the hinge itself when in the open and locked position.

To this end, many commercially available heavy lift UAV's, utilize boom hinges that transition the booms vertically relative to the main body. In this regard, the load applied onto the hinge is parallel to the movement of the hinge itself, thus lending to excess movement. Conversely, other systems that permit lateral movement of the booms utilize an external latch to maintain the boom in the open position. Unfortunately, this latch does not often have precise tolerances to maintain the boom in the fully open position.

The present invention directed to a heavy-lift UAV frame differs from the conventional art in a number of aspects. The manner by which will become more apparent in the description which follows, particularly when read in conjunction with the accompanying drawings.

SUMMARY OF THE INVENTION

The present invention is directed to a heavy-lift UAV frame. One embodiment of the present invention can include a central frame portion having a symmetrical shape and forming a pocket area for receiving an avionics package. A top and bottom plate can be secured to the central frame portion and can include four corner members extending diagonally outward therefrom.

Another embodiment of the present invention can include a plurality of boom hinges that are interposed between each of the corner members and an elongated boom arm. Each of the boom hinges can be pivotally connected to the boom arms and can transition the boom arms between an extended position for flight and a retracted position for storage and transport. Each boom arm and boom hinge can include a complementary dimension to one side of the central frame portion so as to arrange each boom arm parallel thereto when in the retracted position.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1A.

As described throughout this document, the term "complementary dimension," shall be used to describe a situation wherein an object includes a size that is identical to, or substantially identical to the size of another component, in terms of length, and/or width, and/or height, for example.

As described herein, the term "removably secured," "removably engaged" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and compression fittings such as hooks, snaps and buttons, for example.

As described herein, the term "pivotally connected," "rotatably secured" and all derivatives shall be used interchangeably to describe a situation wherein two or more objects are joined together in a manner that allows one or both of the objects to pivot and/or rotate about or in relation to the other object along one or more axes.

FIGS. 1A-4C illustrate various embodiments of heavy lift UAV frame 10 that is useful for understanding the inventive concepts disclosed herein. As shown, the device 10 can include, essentially a main body 11 having a plurality of booms 21 that are pivotally secured thereon.

Figure 1A:
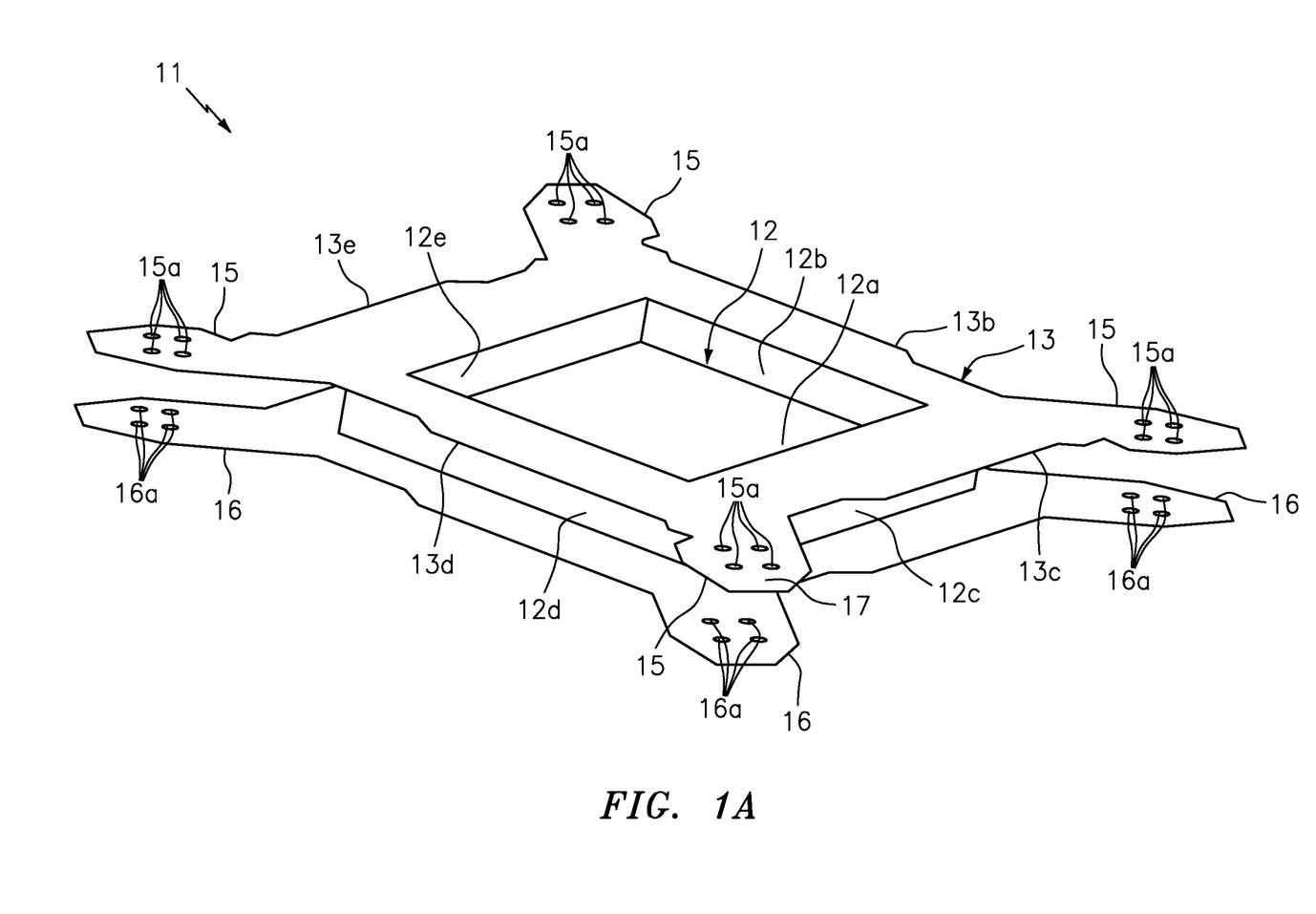
FIG. 1A is a perspective view of the top side of the central frame portion that is useful for understanding the inventive concepts disclosed herein.
Figure 1B:
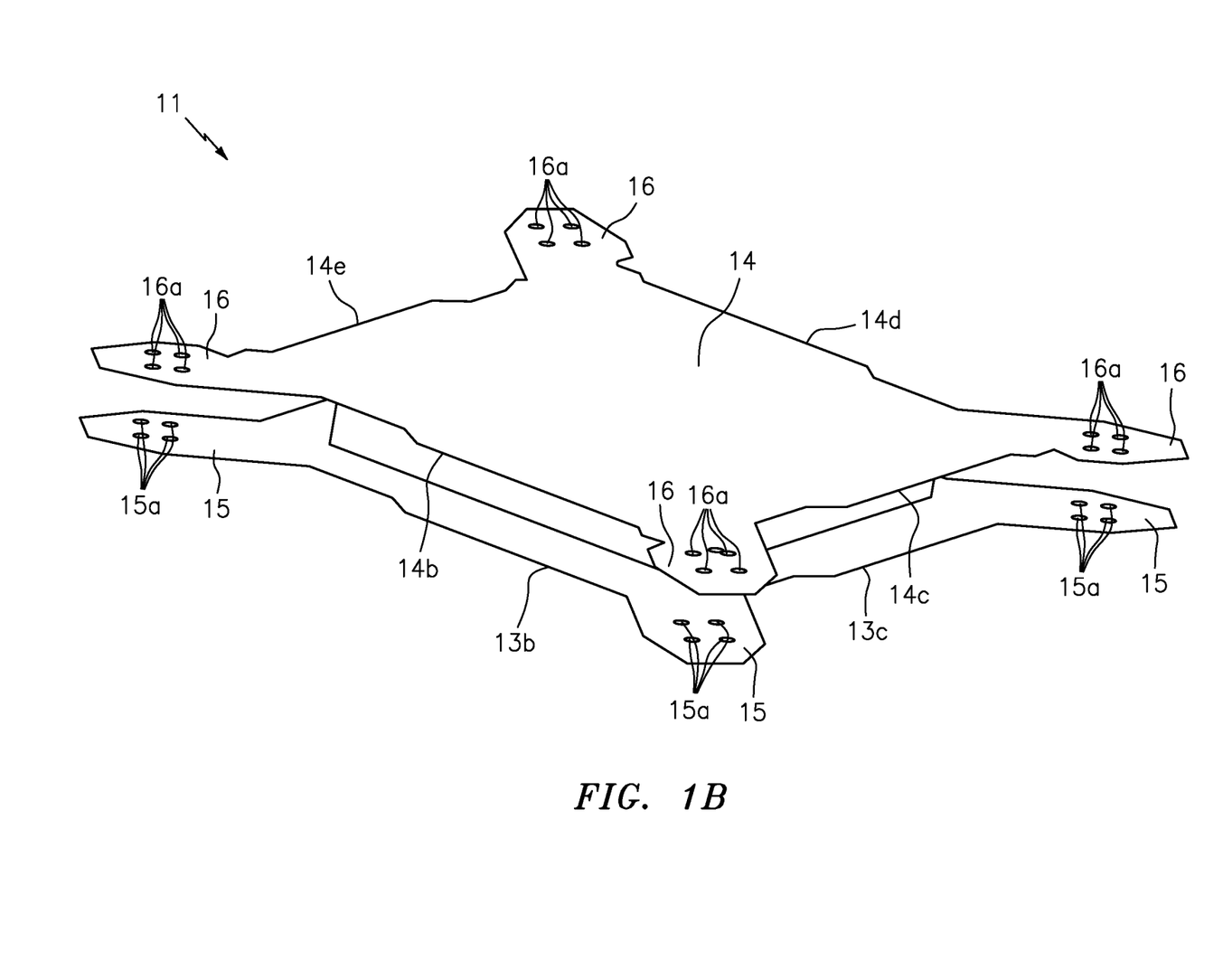
FIG. 1B is a perspective view of the bottom side of the central frame portion, in accordance with one embodiment of the invention.

As shown best in FIGS. 1A and 1B, the main body 11 can include a generally square shaped central body portion 12 for receiving and storing any type of avionics. As such, the central body portion can include a recessed bottom wall 12a and a plurality of raised side walls 12b, 12c, 12d, and 12e. By encircling the delicate avionics within the rigid frame members of the central body portion 12, the main body 11 advantageously forms a pocket area that can protect and shelter the delicate components from being directly impacted by another object in the event of a crash.

The main body can also include a top plate 13 having edges 13b, 13c, 13d and 13e, and a bottom plate 14 having edges 14b, 14c, 14d and 14e. Top and bottom edges 13b-13e and 14b-14e being arranged so as to extend outward from the central walls 12b-12e, respectively. As shown, each of the top and bottom plates can also include corner members 15 and 16, respectively, which extend diagonally outward from the central portion 12. The distal ends of the top and bottom corner members can include a plurality of apertures 15a and 16a, respectively, that are aligned vertically so as to receive the below described boom hinge 30.

In the preferred embodiment, the main body 11 can be constructed from a lightweight and sturdy material such as aluminum, for example, however other construction materials such as plastic, carbon fiber and other forms of composite materials are also contemplated. The central body portion 12, the top plate 13 and the bottom plate 14 can be constructed from identical or different materials and can be secured together in any number of commercially known manners.

Figure 2:
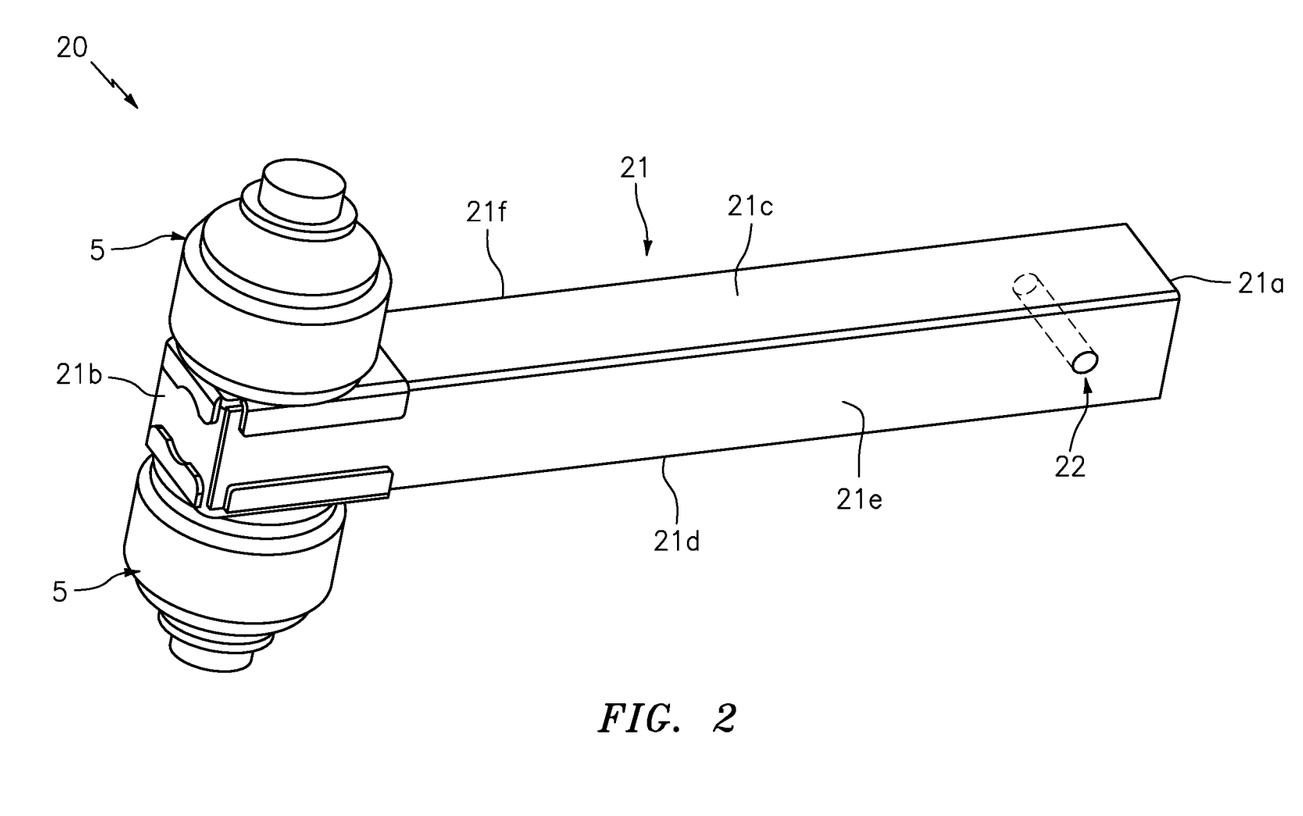
FIG. 2 is a perspective view of a boom arm of the heavy-lift UAV frame, in accordance with one embodiment of the invention.

FIG. 2 illustrates one embodiment of a boom arm 20 which can be pivotally secured onto each corner of the main body via the below described boom hinge 30. As shown, the boom can include an arm member 21 that is preferably in the shape of a hollow square tube, having a first end 21a, a second end 21b a top surface 21c a bottom surface 21d and a pair of side surfaces 21e and 21f. The second end of the boom arm 21b can function to receive and securely position a pair of electric engines 5 along both the top and bottom surfaces thereof. When such engines are installed, the engine control cables (not illustrated) can be routed through the hollow portion of the arm and hinge for connection to an avionics package located on the main body 11. The first end of the boom arm 21a can include a horizontal channel 22 for receiving a locking shaft of the boom hinge.

Figure 3A:
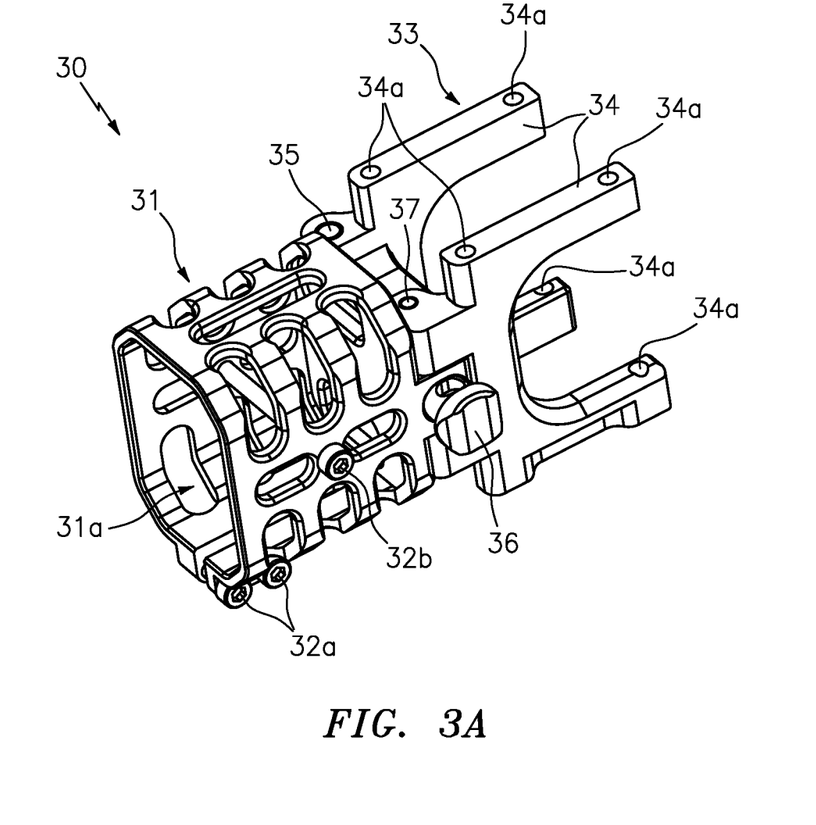
FIG. 3A is a perspective view of a boom hinge of the heavy-lift UAV frame in the open position, in accordance with one embodiment of the invention.
Figure 3B:
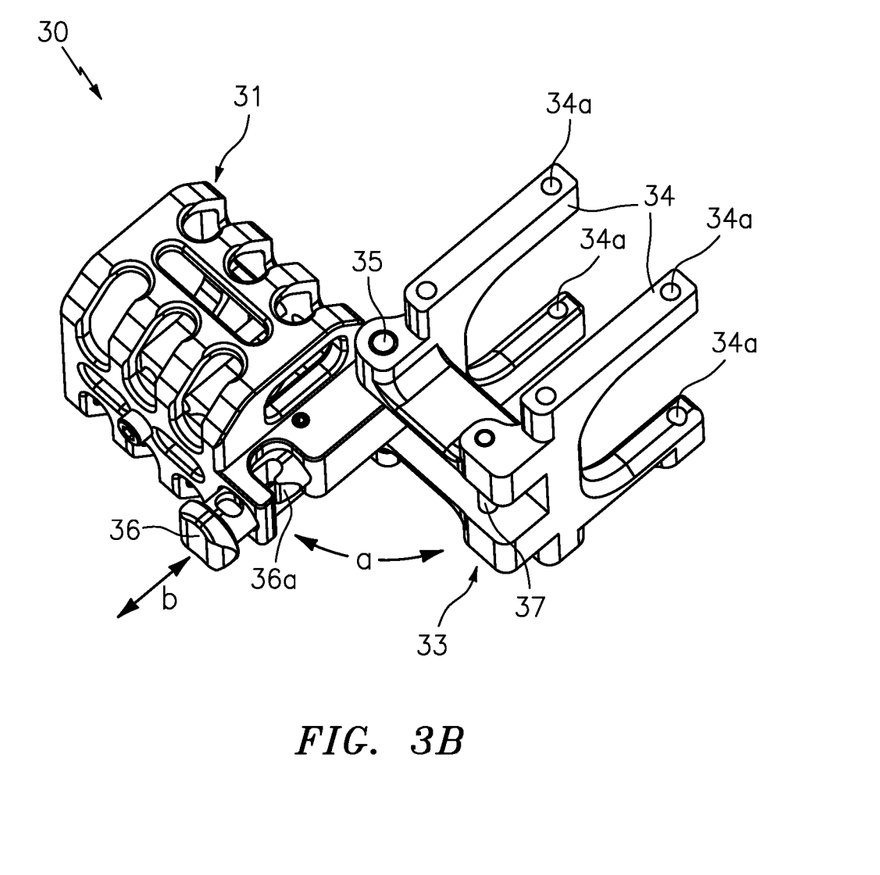
FIG. 3B is a perspective view of a boom hinge of the heavy-lift UAV frame in the closed position, in accordance with one embodiment of the invention.

FIGS. 3A and 3B illustrate one embodiment of a boom hinge 30. As shown, the hinge 30 can include a first body section 31 having an open first end that leads to a hollow interior space 31a for receiving the first end 21a of a boom arm 20. A pair of boom clamping screws 32a are provided so as to allow a user to tighten the hinge onto a boom arm that is positioned within the hollow interior space. Likewise, an elongated safety screw 32b is removably positioned through the horizontal channel 22 of the boom arm secured within the hollow interior space to prevent separation of the arm and hinge.

The boom hinge can also include a second body section 33 having a pair of generally U-shaped protrusions 34 each having apertures 34a extending therethrough. Apertures 34a including a shape, size and orientation that are complementary to the shape, size and orientation of apertures 15a and 16a, so as to receive mounting hardware 34b therethrough.

As shown best at FIG. 3B, a pivoting pin 35 can be positioned between the first and second body sections 31 and 33, respectively, to permit both sections to pivot (see arrow a), relative to the other. In one embodiment, a spring loaded sliding locking pin 36 can be positioned along the first body member. The lock pin can include an opening 36a for selectively engaging a retainment pin 37 that is positioned on the second body section 33. When the lock pin 36 is secured onto the retainment pin 37, the hinge is immobilized. In this regard, the hinge can transition from the open position shown at FIG. 3A and the folded position shown at FIG. 3B via movement (see arrow b) of the lock pin 36. Moreover, it is noted that movement of the hinge is perpendicular to the lifting force applied by the boom arms onto the main body. As such, the boom hinge has no excessive play/vertical slop, and therefore reduces or eliminates problematic vibrations of the boom arms noted above.

Figure 4A:
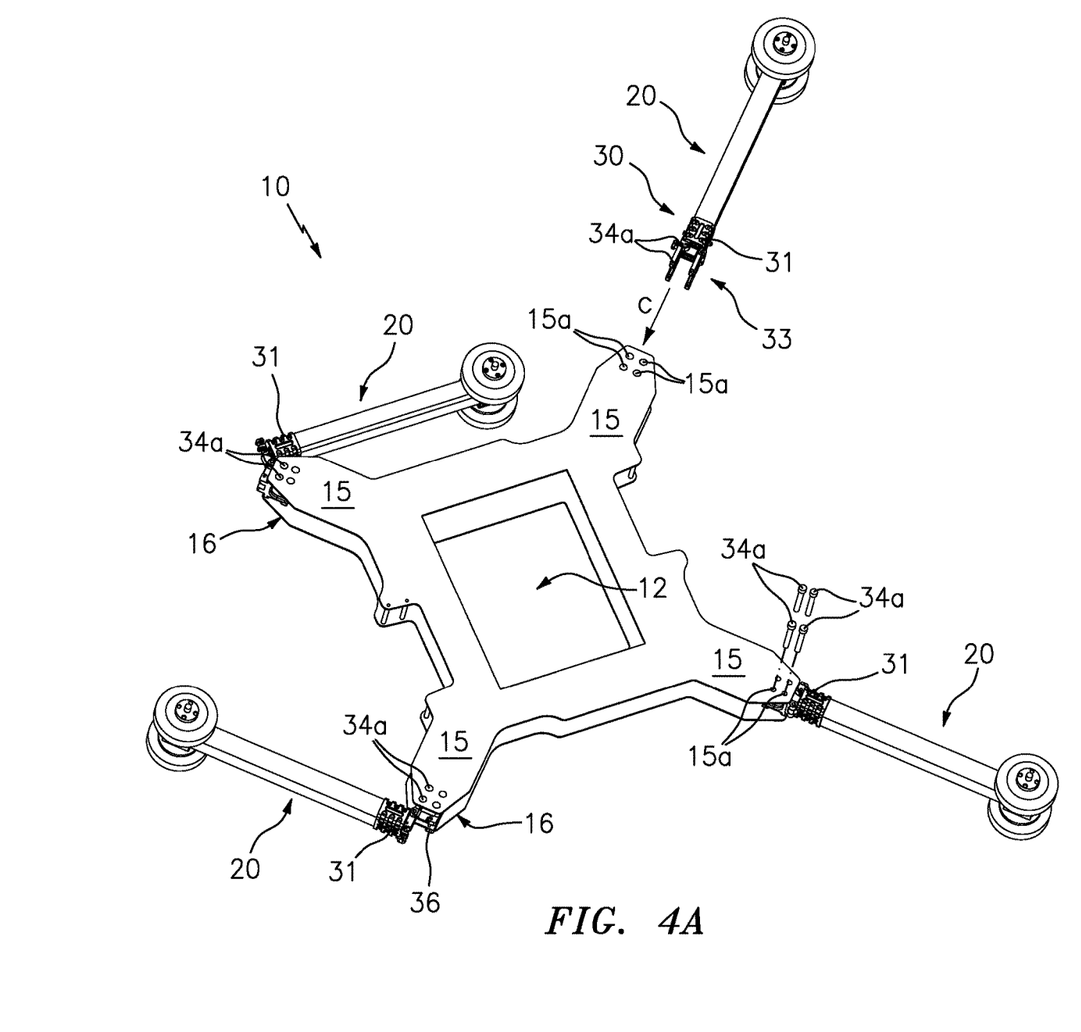
FIG. 4A is an exploded parts view of the heavy-lift UAV frame, in accordance with one embodiment of the invention.
Figure 4B:
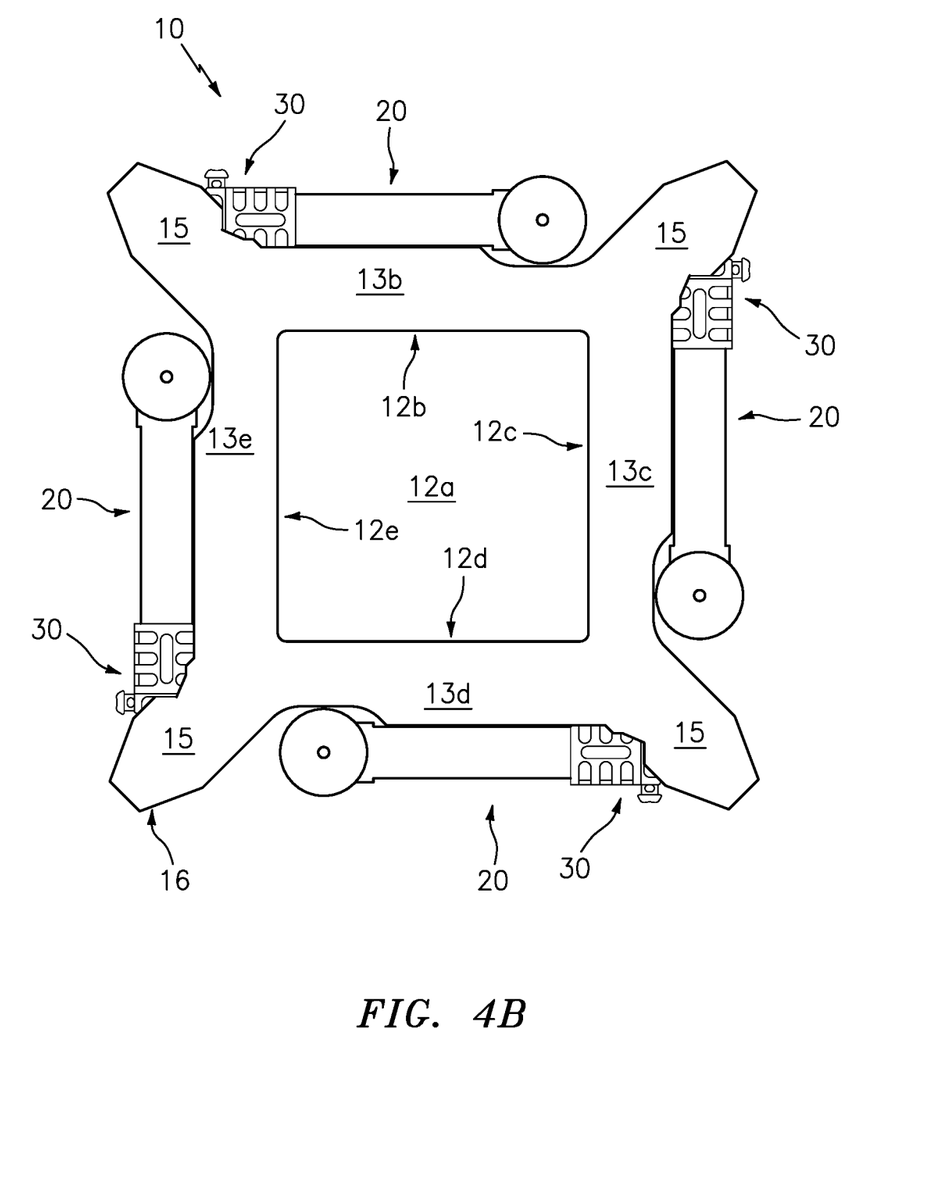
FIG. 4B is a perspective view of the heavy-lift UAV frame in the retracted position, in accordance with one embodiment of the invention.
Figure 4C:
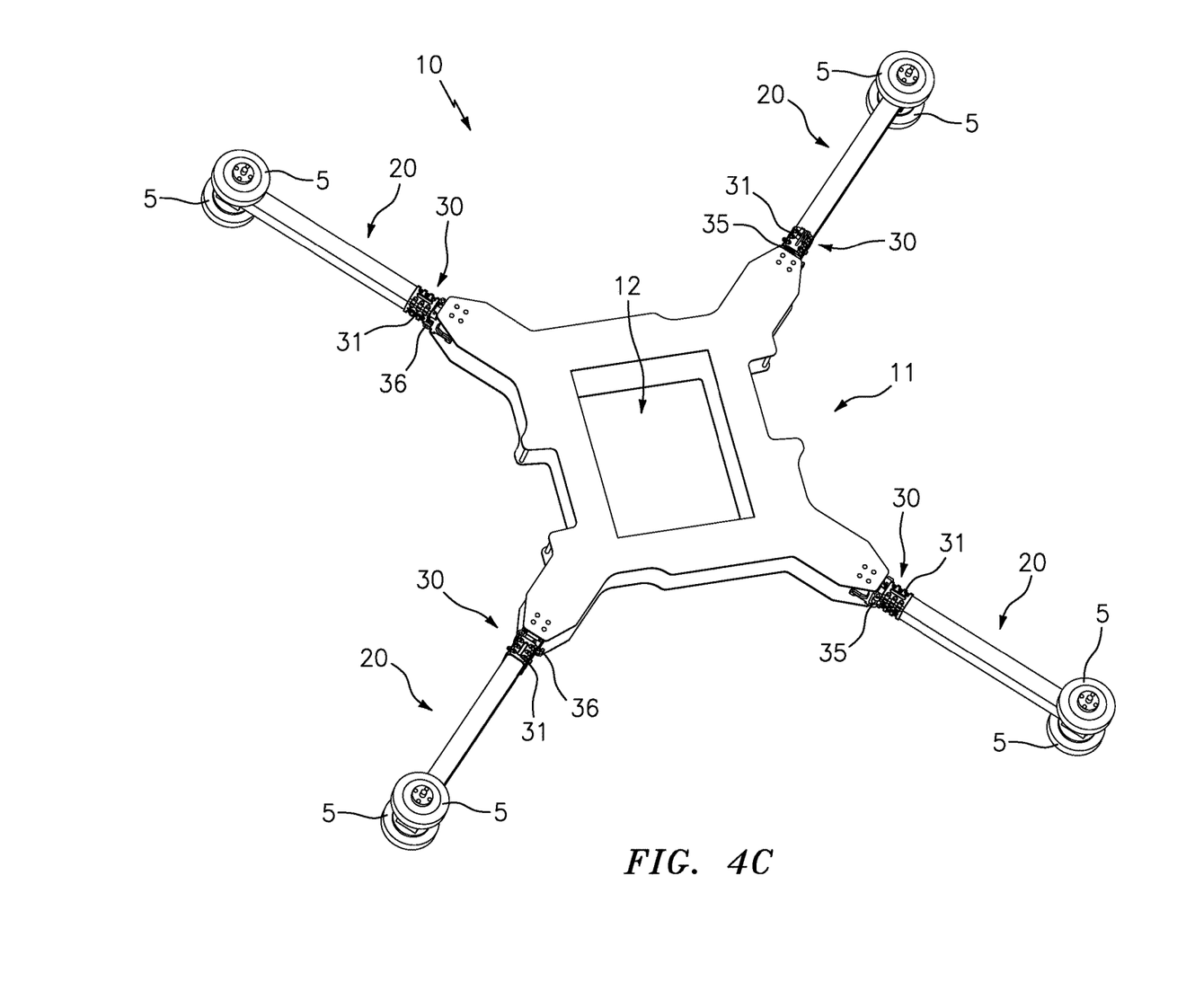
FIG. 4C is a perspective view of the heavy-lift UAV frame in the extended position, in accordance with one embodiment of the invention.

As shown in FIGS. 4A-4C, the heavy-lift UAV frame 10 can include four boom arms 20 which can be pivotally secured onto the corner of the main body via the above described boom hinges. As shown best in FIG. 4A, the first end of each boom arm can be positioned inside the first end of the boom hinge 31, and the second end of each boom hinge 33 can be positioned between the corner members 15 and 16 (See arrow c). At this time, apertures 34a, 15a and 16a will be aligned vertically, and can function to receive mounting hardware 34a, such as the illustrated screws, for example, to prevent inadvertent separation of the hinge and frame. When fully installed, the hinge 30 can pivot each boom arm horizontally between a fully extended position and a fully retracted position.

As shown in FIG. 4B, each hinge 30 and attached boom arm 20 can include a length/assembled dimension (e.g., distance between elements 33 and 21b) that is complementary to the length of one side of the central body walls 12b-12e and/or edges 13b-13e and 14b-14e. This dimension, combined with the symmetrical square shape of the central body portion, advantageously allows the assembled frame 10 to transition to a fully retracted position, wherein each boom arm 20 can be pivoted until it is located parallel with one side of the central body portion 12b-12e and/or edges 13b-13e and 14b-14e, respectively. When so positioned, the corner members 15 and 16 will be the outermost components of the frame. Such a design advantageously allows the sturdy corner members to protect the boom arms against impacts with foreign objects when the frame member is retracted for storage and/or transport.

FIG. 4C illustrates one embodiment of the frame 10 in the fully extended position, wherein each of the boom arms are extending outward from the corner of the main body and are locked in place by the locking pin 36 and retainment pin 37 of the boom hinge 30. As each of the boom hinge and arm combination includes a length that is complementary to the length of each of the side walls of the central body portion 12, the frame remains completely symmetrical from each side when fully extended. This symmetrical design combined with the absence of slop within the boom hinge advantageously eliminates much of the vibrations that are experienced by other known devices, as each of the engines 5 are positioned at a uniform distance from each other and the payload/avionics being carried by the central portion of the frame 12.

Although dimensions are not critical, in the preferred embodiment, the main body 11 can preferably include a diagonal length between each corner section of approximately 30 inches. Likewise, each boom 20 and hinge 30 combination can preferably include a length of approximately 24 inches from end to end. Such dimensions being suitable for allowing each boom to support two engines having 32 inch propellers giving the frame a lifting capacity of over 1,000 pounds. Of course, other sizes are also contemplated.

As described herein, one or more elements of the heavy-lift UAV frame 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A UAV frame, comprising:
   a symmetrical-shaped central body portion having a plurality of side walls and a recessed bottom wall;
   a top plate having a central aperture, said top plate being secured along a top portion of the central main body;
   a bottom plate that is secured along a bottom portion of the central main body;
   a plurality of corner members that are defined by the top plate and the bottom plate;
   a plurality of boom hinges, each of said boom hinges having a first and a second end, wherein the second end is positioned within one of the plurality of corner members; and
   a plurality of elongated boom arms, each of said boom arms having a first end that is connected to the first end of one of the plurality of boom hinges,
   wherein each of the plurality of elongated boom arms are configured to pivot between a retracted position and an extended position.

2. The frame of claim 1, wherein each of the plurality of boom arms and boom hinges include an assembled dimension that is complementary to a dimension of one of the plurality of side walls of the central body portion, and each of the plurality of boom arms are positioned parallel to one of the plurality of side walls of the central body portion when the frame is in the retracted position.

3. The frame of claim 1, wherein the plurality of boom arms comprise:
four identical boom arms that are positioned diagonal to one of the side walls of the central body portion when the frame is in the extended position.

4. The frame of claim 1, wherein each of the boom hinges are configured to independently pivot between an open position and a closed position.

5. The frame of claim 4, wherein each of the boom hinges independently pivot in a direction that is perpendicular to a lifting force applied by the boom arms onto the main body during flight.

6. The frame of claim 4, wherein each of the boom hinges includes a spring loaded locking pin for securing the respective boom hinge in the open position.

7. The frame of claim 6, wherein each of the boom hinges includes a pivoting pin that is positioned perpendicular to a direction of the locking pin.

* * * * *